Sept. 22, 1953   C. R. CROY   2,652,748
OPTICAL IMAGE FOCUSING APPARATUS
Filed Aug. 15, 1951

INVENTOR.
CHARLES R. CROY
BY Edward M. Apple
ATTORNEY

Patented Sept. 22, 1953

2,652,748

UNITED STATES PATENT OFFICE 2,652,748

OPTICAL IMAGE FOCUSING APPARATUS

Charles R. Croy, Ecorse, Mich.

Application August 15, 1951, Serial No. 241,973

15 Claims. (Cl. 88—57)

This invention relates to focusing apparatus and has particular reference to an apparatus which will focus the image of an object in upright position and with improved depth effect. This application may be considered a continuation in part of my copending application, Serial No. 192,509, filed October 27, 1950, and now Patent No. 2,638,815, dated May 19, 1953.

An object of the invention is to provide a device of the character indicated, which is suitable for use with a camera, a projecting machine or other photographic and optical equipment.

A further object of the invention is to generally improve devices of the character indicated and to provide a focusing instrument which is simple in construction, economical to manufacture, efficient in operation, and one readily adaptable to presently known and conventional equipment.

Another object of the invention is the provision of a focusing apparatus which, when used with a camera or projector, will produce a picture on the film or screen in upright position and with improved depth.

Another object of the invention is to provide a focusing device which is easily assembled and dismantled for cleaning and repair.

The foregoing and other objects and advantages of the invention will become more apparent as the description proceeds, reference being made from time to time to the accompanying drawings, forming part of the within disclosure, in which drawings.

Figure 1:
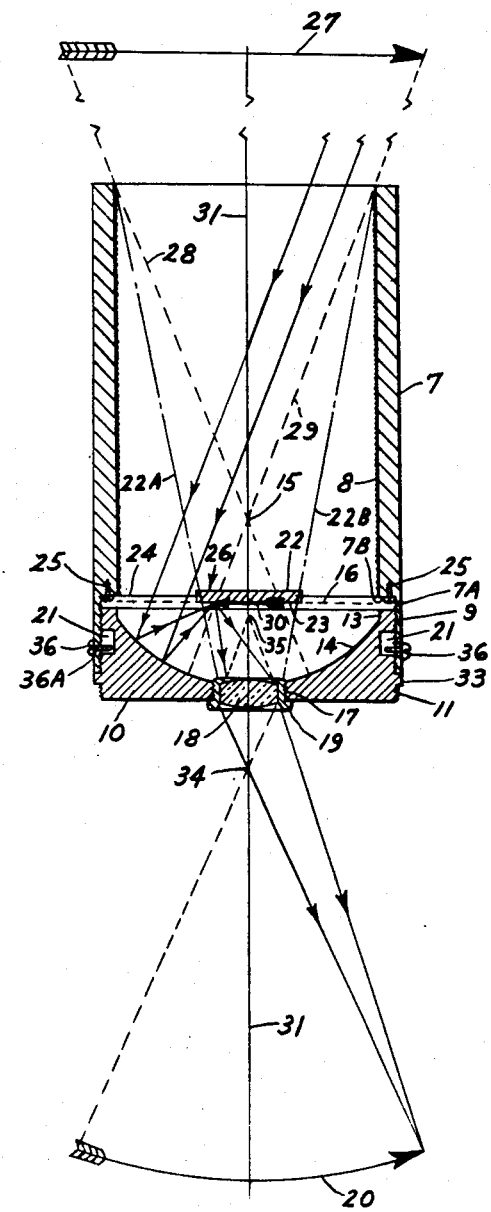
Fig. 1 is a longitudinal section taken through a device embodying the invention and taken substantially on the line 1—1 of Fig. 2.
Figure 2:
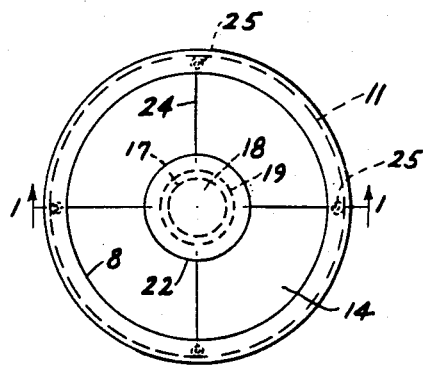
Fig. 2 is a top plan view of the device shown in Fig. 1.

Referring now more particularly to the drawings, it will be understood that in the embodiment herein disclosed, the reference character 7 indicates a tubular member of proper size and length formed of aluminum or other suitable material which is ribbed and colored flat black on the inside, as at 8, to obviate any tendency of stray light being deflected from the walls of the tube in a manner which would interfere with the proper functioning of the apparatus. The tubular member 7 has a reduced wall thickness as at 7A forming a shoulder 7B. The reduced section 7A is threaded as at 9, to engage external threads formed on the end closure member 10, which is made of any suitable material capable of receiving and holding a mirror finish. The end closure member 10 is also externally threaded as at 11, so that the device may be secured to a camera or other photographic and optical devices. A shoulder 33 serves as an abutment when the device is secured to another instrument.

The top rim portion 13 of the end closure member 10 is ribbed and colored black, and serves the same purpose as the ribs and coloring on the interior of the tubular member 7. The inner wall 14 of the end closure member 10 is concave and is provided with a highly reflective mirror surface and serves as a concave mirror having its pivot point or center of curvature at 15, and having its infinity focal plane at 16. The infinity focal plane 16 is the plane of turnover for the concave focal action and the concave mirror action at axial alignment.

Figure 3:
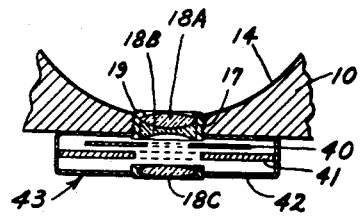
Fig. 3 is a fragmentary sectional view taken through the end closure member and illustrating a modified form of lens arrangement together with an assembly unit holding an iris and shutter, and means for attaching the assembly unit to the end closure member.

The end closure member 10 is provided with a centrally positioned threaded opening 17, in which is positioned a suitable assembly 43, as in Fig. 3, or a single lens as 18, in Fig. 1.

The lens 18, Fig. 1, or assembly 43, Fig. 3, is provided with a focal length suitable for focusing an image as at 20, and its focal point 35 must locate as shown in the drawing (Fig. 1), (a little below the infinite image plane 16 of the concave mirror 14 and on the axis 31 in order to function properly).

A plane mirror 22, having its reflective surface 23 facing the lens 18 and concave mirror 14, is suspended by means of four fine wires 24 colored black which are preferably embedded in the edges of the plane mirror 22, the opposite ends of which are looped to engage screws 25, which are adapted to engage threaded recesses formed in the shoulder 7B of the tubular member 7. It will be noted that the reflective surface 23 of the round plane mirror 22 cuts the infinity image plane 16 of the concave mirror 14 and the image 30 on the plane 16 is located between the radius lines 28 and 29 defining the infinite setting for the plane mirror surface 23.

The plane mirror 22 is circular and its diameter is slightly larger than the diameter of the opening 17 in the concave mirror 14 in order to stop stray light rays from interfering with the function of the lens 18. In other words, the plane mirror 22 will cut off all unwanted rays of light which strike the top surface 26 of the mirror 22, between lines 22A and 22B. The back 26 of the mirror 22 is ribbed and colored black to effect the same results as the ribs and coloring 8 on the inside of the tubular member 7.

The reflective surface 23 of the mirror 22 is located midway between the surface of the concave mirror 14 and the center of curvature 15 and is centrally aligned with the axis 31, which location is also the image focal plane, for infinite setting of the concave mirror 14. The plane mirror 22 is arranged to move by adjustment toward the center of curvature 15 of the concave mirror 14, when focusing the image plane of the concave mirror 14 for objects that are closer to the apparatus than infinite distance.

Screw bolts 36 are threaded into and engage the threaded holes 36A in the lower end, and on the sides of the tubular member 7, and also extend into a recessed groove 21 formed in the outer periphery of the end closure member 10. The walls of the groove 21 limit the amount of adjustment which can be made to the plane mirror 22 by turning the tubular member 7 one way or the other on the threads 9. This groove 21 also keeps the tubular member 7 from being displaced from the end closure member 10 by accident.

The round plane mirror 22 must be large enough in diameter to cover the angles 22A and 22B for any focal adjustment used, so unwanted light rays will not interfere with the proper functions of the apparatus.

In Fig. 3, I illustrate a modification in which the single lens 18 (Fig. 1) is replaced by means of an assembly unit 43 which is provided with a threaded element 19 adapted to engage the threads formed in the threaded opening 17 of the end closure member 10, whereby the assembly 43 may be secured to the end closure member 10. The assembly 43 includes the lenses 18A, 18B and 18C, an iris diaphragm 40, a shutter 41, and a housing 42 which supports and protects the elements of the assembly. An assembly such as 43 is essential when it is desired to take pictures with this apparatus, but the iris diaphragm 40, and shutter 41, may be dispensed with when the apparatus is employed for projecting pictures, as the lens elements 18A, 18B and 18C (Fig. 1) will suffice for the projecting operation. Such an assembly as 43 incorporating an iris diaphragm, a shutter and lens elements is ideally suited, and a necessity for taking pictures as I can control the amount of light passing through the lens by varying the iris diaphragm and the shutter, thus eliminating any tendency to over or under expose the film. Such an apparatus is excellent for both moving pictures and still cameras as the pictures will show remarkable depth particularly when projected onto a screen.

Any good lens, or compounded element lens can be used in place of the lens 18, Fig. 1, as the lens 18 was used for simplicity in explaining its functions. The lens 18 will have to have a focal point short enough to fall a little below the concave mirror infinite image plane 16 and on the axis 31. The exact focal point location of the lens 18 will have to be determined for the particular job the apparatus is used for, but for average and normal camera and projection use, the focal point 35 of the lens 18 will locate where it is shown in the drawing and on the axis 31. The focal point location also applies to lens assemblies as 43.

By mounting this focusing apparatus on a bellows type camera (not shown) and by synchronizing the bellows in opposite movement to the movement of the plane mirror 22, I can adjust both the focused image picture and the film location so that they will fall on the same plane and remain constant in position, and by rotating the tubular member 7 from one side to the other (or in one direction and then the other), I can do all the adjusting necessary to focus the final picture image on the film plane location.

The device functions as follows. Assuming that the object 27 is located between the radius lines 28 and 29, at infinite distance from the concave mirror 14, all rays of light leaving the object 27 and striking the concave mirror 14 will be reflected toward the plane mirror surface 23 and will form an inverted image 30 of the infinite object 27 on the plane mirrors surface 23 when the plane mirrors surface 23 cuts the infinite image focal plane 16 of the concave mirror 14. This silvered surface 23 of the plane mirror 22 activates the inverted image 30 so that the lens 18 can see it more clearly the better to pick it up as an acting object and focus a picture image of it as at 20.

The inverted image 30 of the object 27 acts as an object for lens 18 and the rays of light stemming from this acting object 30, which are picked up by the lens 18 will be focused by the lens 18 and form the final picture image 20 along its focal plane, which in a camera installation would be the film. The picture image 20 is upright with respect to the object 27 and is curved as shown in Fig. 1, but due to its tremendous depth of focus, a flat thin film can be used.

Now, by reason of the plane mirror 22 being fastened to the bottom end of the tubular member 7 with the wire supports 24 and screws 25, I am able to focus with the plane mirror 22 for the concave mirror 14, by raising or lowering it. When I turn the tubular member 7 from side to side, so that as the infinite object 27 moves closer to the concave mirror 14, then the final picture image 20 also moves closer to the lens 18 when the plane mirror 22 is adjusted to focus. This is due to the lens 18 being stationary and not being adjustable for focal adjustment, as is the assembly 43.

This picture image 20 can be made to fall on a given plane location by two methods, so that the picture image 20 and the film fall on the same location.

First, I can use an assembly such as 43, Fig. 3, in place of the lens 18 Fig. 1. The assembly 43 has several lens elements 18A, 18B, and 18C in its embodiment, and by varying the distance of these lens elements by adjustment, I can focus the acting object 30 and make its image 20 locate on the film.

So if I synchronize the plane mirror adjustment with that of varying the lens elements 18A, 18B, and 18C (Fig. 3) in proper respect and adustment with the plane mirror, then I can make the picture image 20 fall on the film, at the same time I turn the tubular member 7 for focusing the concave mirror action, by adjusting the plane mirror, as it will automatically adjust both the plane mirror 22 and lens elements 18A, 18B, and 18C when I rotate the tubular member 7 if the synchronization is accurate.

The second way is to mount the apparatus on a bellows type camera and synchronize the bellows movement in opposite direction to the movement of the plane mirror so that both opposite directions of movement for the plane mirror 22 and bellows can be controlled when adjusting the tubular member 7 from side to side or in the direction needed to focus.

This apparatus will produce by focus, and on film, a similar action that one sees in a plane mirror, as far as the eyes are concerned.

A good example is to walk towards a large plane mirror and note how the depth stands out. This same reaction to the eyes will be present when viewing a projected picture on a screen, providing the picture has been taken and projected with this kind of an apparatus.

The picture will be taken with the object facing the concave mirror end of the apparatus, while the projecting is done with the object facing the lens end of the apparatus. It will be noted that one is reverse action to the other and that this apparatus is definitely directional, one direction being for taking pictures and the other for projecting pictures.

This apparatus takes the picture from the concave mirror end 14 as indicated by the arrows showing the direction of the light rays from the object to the concave mirror 14.

But when using this apparatus for projecting purposes, it works in reverse, or from the lens end, and by placing the object or film where the picture image is located and at the axis position of cross over, then it will project an image of this object where the original object 27 was located, and the axial positions will remain constant, but the image will have a slight curvature and bend towards the apparatus.

Having described my invention what I claim and desire to secure by Letters Patent is:

1. In a device of the character described in combination, a tubular member, an end closure member forming a concave mirror, a centrally positioned opening in the concave mirror, an assembly incorporating an iris diaphragm, a shutter and lens elements in said opening and in axial alignment, a plane mirror suspended by inconspicuous wires in said tubular member and located between the surface of the concave mirror and its center of curvature, whereby a focused image is placed on said plane mirror, there being means on said end closure member and said tubular member for adjusting the distance between said mirrors by rotating the tubular member.

2. The structure of claim 1, in which the mirror adjustment is governed by stops carried on the tubular element which ride in a groove formed in the outer periphery of the end closure member.

3. The structure defined in claim 1, in which said plane mirror has its reflective surface lying on the infinite image focal plane of said concave mirror, when used at infinity setting, and the adjustment of said flat mirror for focusing purposes, is between the infinite image focal plane of the concave mirror and its center of curvature.

4. The structure defined in claim 1, in which the diameter of said plane mirror is slightly larger than the diameter of said lens opening in the concave mirror.

5. The structure defined in claim 1 in which said plane mirror suspending means engage a rim formed on the bottom end of the tubular member.

6. The structure defined in claim 1, in which said end closure member is externally threaded at one end to engage corresponding threads on said tubular member, whereby the said end closure member is moved axially of said tubular member.

7. The structure defined in claim 1, in which said end closure member has external threads on the bottom portion thereof, whereby it may be secured to another instrument.

8. The structure defined in claim 1, in which said end closure member has a peripheral groove arranged to be covered by a portion of said tubular member, threaded elements in the walls of said tubular member and having extensions arranged to engage the walls of said groove, whereby upon rotation of the tubular member and said end member relative to one another, the focal adjustment of said plane mirror may be controlled.

9. The structure defined in claim 1, in which said tubular member has internal peripheral threads on its bottom portion, arranged to engage external threads on the end closure member.

10. The structure defined in claim 1, in which said tubular member has ribs and black coloring on the inner periphery thereof.

11. A tubular member having a threaded, reduced in thickness, wall portion at one end, an end closure member having a concave mirror surface, said end closure member being axially aligned with and in threaded engagement with the reduced wall portion of said tubular member, means to limit the relative axial movement of said end closure member and said tubular member, a plane mirror having a diameter substantially less than the inside diameter of said tubular member and concentrically supported in said tubular member near the reduced wall portion thereof, and located with respect to said concave mirror, whereby a focused image is placed on said plane mirror, a threaded central opening in said end closure member, having a diameter less than the diameter of said plane mirror, and a focusing lens assembly secured in the opening in said end closure member.

12. The structure of claim 11, in which said lens assembly includes a threaded housing and at least two lenses, an iris diaphragm and a shutter device.

13. The structure defined in claim 1, in which the top and back surface of said plane mirror is ribbed and colored black.

14. The structure defined in claim 1, in which said end closure member has an axially aligned centrally positioned threaded hole arranged to receive a correspondingly threaded mounting means for lens assembly in operative relation thereto.

15. The structure defined in claim 1, in which said end closure member has a peripheral groove in its outer surface, the walls of which are arranged to serve as stops for the focal adjustment distance of the said plane mirror and said concave mirror device.

CHARLES R. CROY.

References Cited in the file of this patent

UNITED STATES PATENTS

| Number | Name | Date |
|---|---|---|
| 2,156,911 | Brown | May 2, 1939 |
| 2,295,779 | Epstein | Sept. 15, 1942 |
| 2,413,286 | Buchle | Dec. 31, 1946 |
| 2,504,383 | Bouwers et al. | Apr. 18, 1950 |
| 2,571,743 | Meyer | Oct. 16, 1951 |

FOREIGN PATENTS

| Number | Country | Date |
|---|---|---|
| 82,671 | Germany | Aug. 7, 1895 |
| 776 | Great Britain | of 1915 |
| 568,058 | Germany | Sept. 15, 1931 |